United States Patent
Bar-Ness et al.

(10) Patent No.: US 7,313,194 B2
(45) Date of Patent: Dec. 25, 2007

(54) METHOD FOR PHASE NOISE MITIGATION IN MIMO-OFDM SYSTEMS

(75) Inventors: Yeheskel Bar-Ness, Marlboro, NJ (US); Songping Wu, Sunnyvale, CA (US)

(73) Assignee: New Jersey Institute of Technology, Newark, NJ (US)

( * ) Notice: Subject to any disclaimer, the term of this patent is extended or adjusted under 35 U.S.C. 154(b) by 344 days.

(21) Appl. No.: 10/969,779

(22) Filed: Oct. 20, 2004

(65) Prior Publication Data

US 2006/0083327 A1    Apr. 20, 2006

(51) Int. Cl.
    *H04L 1/02*   (2006.01)
(52) U.S. Cl. ...................................... 375/267; 375/347
(58) Field of Classification Search ............. 375/267, 375/262, 285, 232, 341, 346–349, 260
    See application file for complete search history.

(56) References Cited

U.S. PATENT DOCUMENTS

2004/0171366 A1*   9/2004   Bar-Ness et al. ......... 455/278.1

OTHER PUBLICATIONS

Schenk et al, "Influence and Suppression of the PHase Noise in Multi-Antenna OFDM", Sep. 2004, IEEE Vehicular Technology Conference, pp. 1443-1447.*

* cited by examiner

*Primary Examiner*—Khanh C. Tran
(74) *Attorney, Agent, or Firm*—Connolly Bove Lodge & Hutz LLP

(57) ABSTRACT

A phase noise mitigation method which mitigates phase noise for MIMO-OFDM. A criterion is provided which jointly optimizes both spectral efficiency and receiver performance by determining the best number of pilots.

7 Claims, 3 Drawing Sheets

SER performance versus phase noise variance levels, 2 transmit antennas and 2 receive antennas, where SNR=20dB, $N_p = 8$

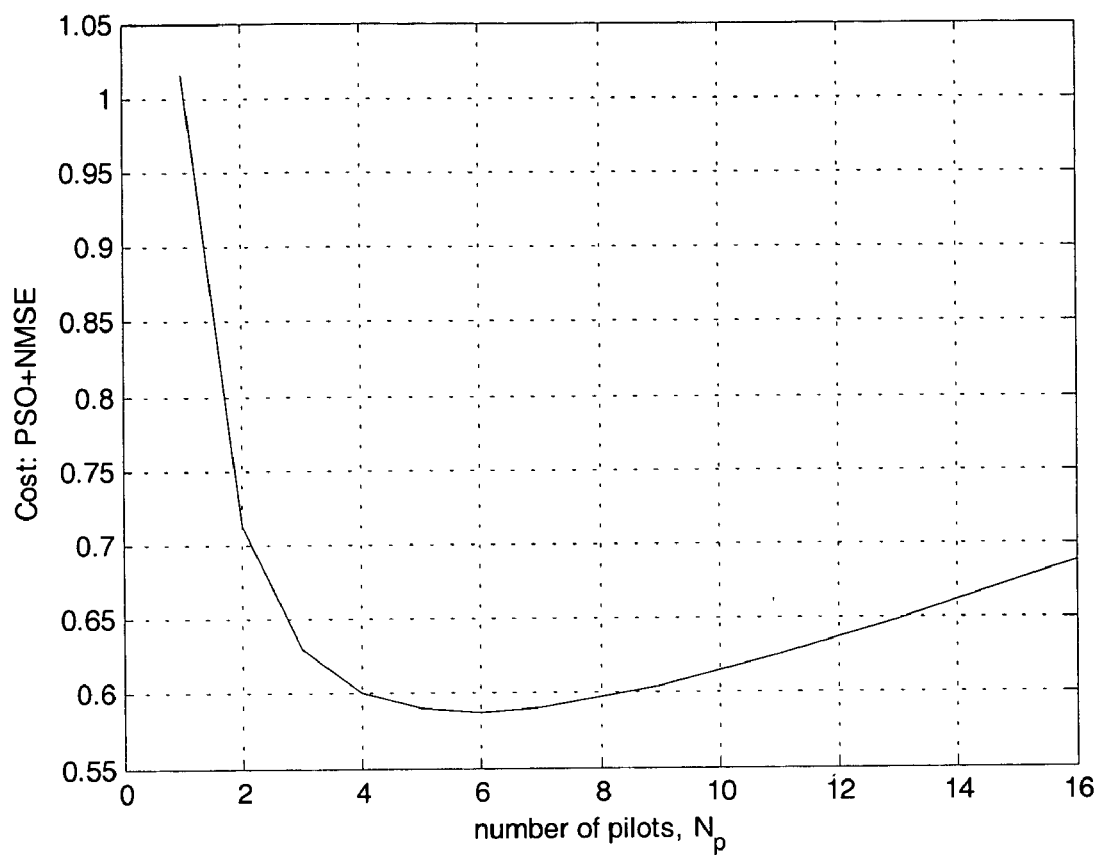
Fig. 1. Number of pilots versus combination of spectral efficiency and estimator performance, where $N = 64$ and $L = 3$

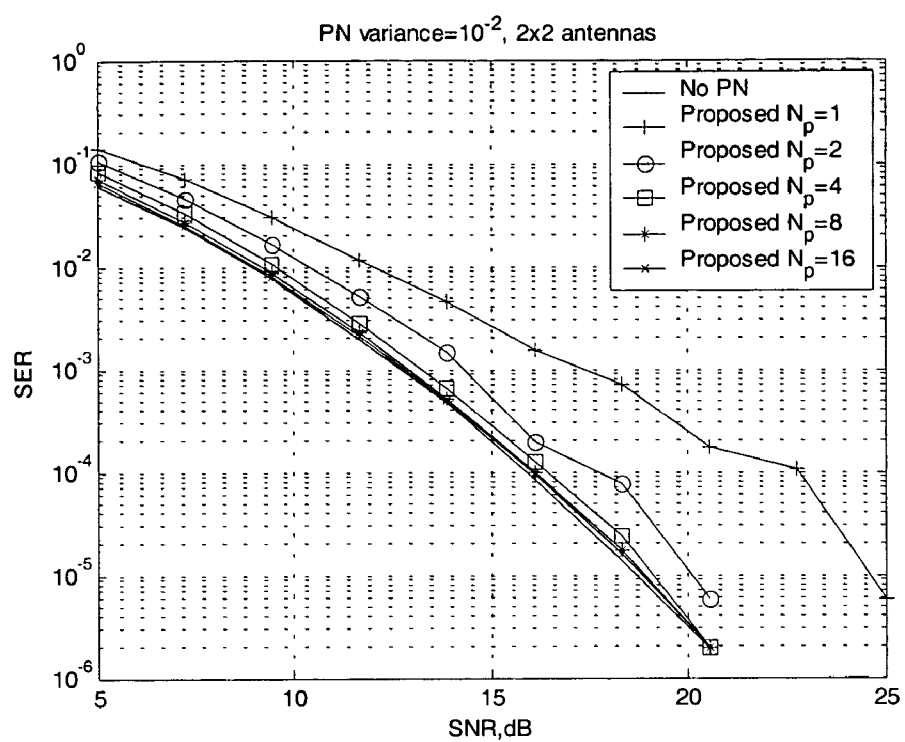
Fig.2. SER performance of the proposed scheme when number of pilots changes, with 2 transmit antennas and 2 receive antennas at the phase noise level of $10^{-2}$ (phase noise variance)

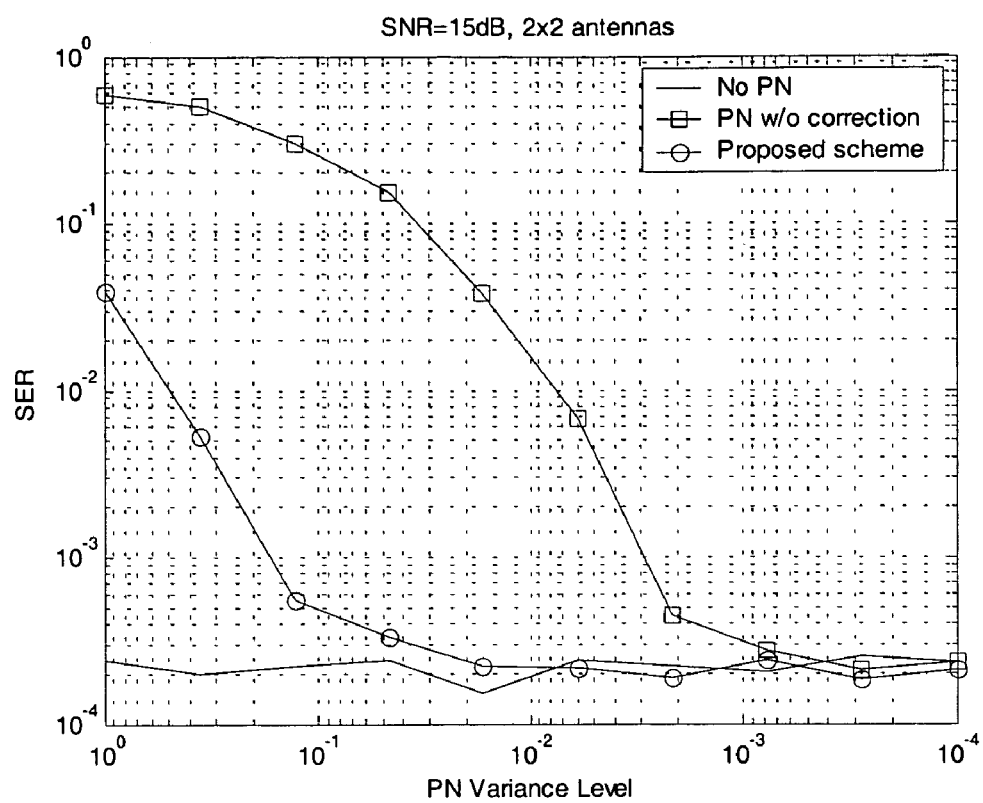
Fig.3. SER performance versus phase noise variance levels, 2 transmit antennas and 2 receive antennas, where SNR=20dB, $N_p = 8$

US 7,313,194 B2

METHOD FOR PHASE NOISE MITIGATION IN MIMO-OFDM SYSTEMS

FEDERALLY SPONSORED RESEARCH

Partial support for the present invention was provided by the National Science Foundation, and accordingly the U.S. Government may have certain license or other rights in the invention.

FIELD OF INVENTION

This invention relates generally to high rate wireless communications, and more specifically relates to phase noise mitigation for space-frequency coded (SFC) MIMO-OFDM systems.

BACKGROUND OF INVENTION

Orthogonal frequency division multiplexing (OFDM) has generated great interest for future high rate wireless communications due to its advantages in mitigating the hostile channel selectivity while enabling a high spectrally efficient modulation technique. Multiple Input Multiple Output (MIMO) technique has emerged as one of the most significant techniques since it could offer substantial improvements over conventional systems in either bit error rate (BER) performance or capacity (transmission data rate) through space diversity or spacing multiplexing. See S. Alamouti, "A simple transmitter diversity scheme for wireless communications," *IEEE J. Select. Areas Commun.*, vol. 16, pp. 1451-1458, October 1998; V. Tarokh and A. Seshadri, "Space-time codes for high data rate wireless communication: Performance criterion and code construction," *IEEE Trans. Inform. Theory*, vol. 44, pp. 744-765, March 1998 and G. J. Foschini and M. J. Gans, "On limits of wireless communications in a fading environment when using multiple antennas," *Wireless Personal Communications*, vol. 6, pp. 311-335, March 1998.

The combined MIMO-OFDM approach, therefore, is quite suitable for future wireless broadband networks by taking advantage of both OFDM and MIMO techniques. However, MIMO-OFDM system suffers severe performance degradation due to phase noise which is caused by the random phase fluctuation of oscillators at either the transmitter or the receiver. Even though various methods have been proposed in the literature to mitigate small phase noise, they are specifically designed for single-antenna systems See P. Robertson and S. Kaiser, "Analysis of the effects of phase noise in orthogonal frequency division multiplexing (OFDM) systems," in *Proc. ICC'95*, (Seattle, Wash.), pp. 1652-1657, 1995.; and S. Wu and Y. Bar-Ness, "A phase noise suppression algorithm for OFDM based WLANs," *IEEE Commun. Lett.*, vol. 6, pp. 535-537, December 2002.

SUMMARY OF INVENTION

Now in accordance with the present invention, a phase noise mitigation method is disclosed which mitigates phase noise for MIMO-OFDM. Numerical results have shown the effectiveness of the method. A criterion is provided which jointly optimizes both spectral efficiency and receiver performance by determining the best number of pilots. The method estimates and compensates for phase noise using pilots received from the multiple receive antennas with minimum square errors. Due to the space diversity introduced by MIMO, the method requires a small number of pilots to achieve both outstanding performance and high spectral efficiency, making it very attractive for practical implementations.

BRIEF DESCRIPTION OF DRAWINGS

In the drawings appended hereto:

FIG. 1 is a graph of number of pilots versus combination of spectral efficiency and estimator performance, where the number of OFDM subcarriers N=64, and maximum delay spread L=3;

FIG. 2 is a graph showing SER (symbol error rate) performance of the present method when number of pilots changes, with 2 transmit antenna and 2 receive antennas at the phase noise level of $10^{-2}$ (phase noise variance); and FIG. 3 is a graph showing SER performance versus phase noise variance levels, 2 transmit antennas and 2 receive antennas, where SNR (signal-to-noise ratio)=20 dB, $N_p$ (number of pilots)=8.

DESCRIPTION OF PREFERRED EMBODIMENT

In a single-user MIMO-OFDM system with $M_t$ transmit antennas and $M_r$ receive antennas, a simple transmit diversity scheme was proposed in S. Alamouti, "A simple transmitter diversity scheme for wireless communications," op cit., using orthogonal space-time coding, and later was extended into the space-frequency domain for MIMO-OFDM with 2×1 ($M_t$=2,$M_r$=1) antennas [K. F. Lee and D. B. Williams, "A space-frequency transmitter diversity technique as for OFDM systems," in *Proc. GLOBECOM'00*, (San Francisco, Calif.), p. 1473 C1477, November 2000.] In this invention, implementing the same space-frequency diversity technique in Lee et al., we consider the case with 2×2 ($M_t$=2,$M_r$=2) antennas transmitting BPSK/QPSK (binary phase shift keying/quadrature phase-shift keying) modulated signals.

At the transmitter side, during the nth OFDM symbol period, the incoming data stream is coded into the sub-streams for two transmit antennas, namely $X^1$ and $X^2$.

$$X_r^1 = [x_r(0) - x_r^*(1) \ldots x_r(N-1) - x_r^*(N-2)]^T \quad (1)$$

$$X_r^2 = [x_r(1) \; x_r^*(0) \ldots x_r(N-2) \; x_r^*(N-1)]^T \quad (2)$$

which implemented the transmit diversity technique in Alamouti and in Lee et al.

$$Y_r^l = [y_r^l(0) \; y_r^l(1) \; \cdots \; y_r^l(N-1)]^T \quad (3)$$

where $$y_r^l(k) = \sum_{m=1}^{2} h_{mr}(k) X_r^m(k) + n_l(k) \quad (4)$$

with k=0, 1, ..., N−1; $X_r^m(k)$ and $h_{mr}(k)$ denote the (k+1)th element of vector $X_r^m(k)$ as defined in (1) and the frequency-domain channel gain between the mth transmit antenna and the lth receiver antenna respectively; $n_l(k)$ is the zero mean AWGN (additive White Gaussian Noise) with variance $\sigma^2$. The space-frequency transmit diversity technique in Lee et al., requires that the fading channel between adjacent sub-carriers does not change much to effectively take advantage of space diversity using combining technique at the receiver.

The imperfect phase synchronization of both transmitter and receiver oscillators causes random phase noise, which can be described as a continuous Brownian motion process with zero mean and variance $2\pi\beta t$, where $\beta$ denotes the phase noise linewidth, i.e., frequency spacing between 3-dB points of its Lorentzian power spectral density function [S. Wu and Y. Bar-Ness, "OFDM systems in the presence of phase noise: consequences and solutions," *To appear in IEEE Trans. Commun.*, 2004.]. Phase noise destroys the orthogonalities among subcarrier signals and causes system degradation. In the presence of phase noise, the expression of (4) is subsequently modified to $$y_r^l(k) = \sum_{m=1}^{2} h_{ml}(k) X_r^m(k) c(0) + \sum_{m=1}^{2} \sum_{n=0, n \neq k}^{N-1} h_{ml}(n) X_r^m(n) c(n-k) + n_l(k) = \quad (5)$$

$$\sum_{m=1}^{2} h_{ml}(k) X_r^m(k) c(0) + n_l'(k)$$

where $$c(n) = \frac{1}{N} \sum_{k=0}^{N-1} e^{j2\pi kn/N + j\varphi(k)}$$

with $\phi^{(k)}$ denoting the phase noise process. Since $\phi^{(k)}$'s are generated by different users, they are independent of each other. It is seen from (5) that phase noise contributes to, common phase error (CPE), indicated by $c(0)$, and intercarrier interference (ICI), indicated by the term $$\sum_{m=1}^{2} \sum_{n=0, n \neq k}^{N-1} h_{ml}(n) X_r^m(n) c(n-k).$$

Phase Noise Estimation: Phase noise, generated by oscillators, is usually small due to advanced semiconductor technologies. Nevertheless, as indicated in the above mentioned S. Wu and Bar-Ness, "OFDM systems in the presence of phase noise: consequences and solutions," even small phase noise is detrimental to OFDM performance. Therefore, many effective schemes have been developed in the literature to mitigate phase noise [See the Robertson et al. and Wu and Bar-Ness publications first cited op. cit.] However, these schemes deal specially with single-antenna systems and are therefore not applicable to MIMO systems. In order to mitigate phase noise for MINO—OFDM systems, a new scheme is used in this invention to mitigate phase noise. Note that MIMO-OFDM channel estimation with accurate results have been discussed in the literature [Y. G. Li, J. H. Winters, and N. R. Sollenberger, "MIAO-OFDM for wireless communications: signal detection with enhanced channel estimation," *IEEE Trans. Commun.*, vol. pp. 1471-1477, September 2002.] Hence, for sake of simplicity, channel is assumed known at the receiver.

Assume there are $N_p$ pilot subcarrier signals (the pilot set termed as $S_p$), which are used for phase noise mitigation. For the better performance of estimator, these pilots shall be evenly distributed within an OFDM symbol. The mitigation criterion is to achieve the minimum square error between received signals and their true values on these pilot positions, i.e., $$\min_{c(0)} \sum_{k \in S_p} \sum_{l=1}^{2} \left| y_r^l(k) - \sum_{m=1}^{2} h_{ml}(k) X_r^m(k) c(0) \right|^2 \quad (6)$$

After algebraic manipulations, (6) gives rise to the solution for $c(0)$, namely $$c(0) = \frac{\sum_{k \in S_p} \sum_{l=1}^{2} y_r^l(k) \left\{ \sum_{m=1}^{2} h_{ml}^*(k) [X_r^m(k)]^* \right\}}{\sum_{k \in S_p} \sum_{l=1}^{2} \left| \sum_{m=1}^{2} h_{ml}(k) X_r^m(k) \right|^2} \quad (7)$$

Note that the estimator of $c(0)$ in (7) becomes more accurate with larger number of pilots $N_p$. But this will lower spectral efficiency and make computational complexity higher. In other words, there is a tradeoff between performance and efficiency of computation and spectrum.

Criterion for Choosing Number of Pilots: It is readily seen that larger number of pilots leads to a better performance of the CPE estimator (7), but with decreased spectral efficiency. Here we provide a design criterion to determine the number of pilots which maintains optimal balance between performance and spectral efficiency.

The pilot spectral occupancy (PSO) is given by $$PSO = N_p/N \quad (8)$$

which needs to be as small as possible. On the other hand, the mean square error (MSE) of the CPE estimator is obtained by substituting (5) into (7), $$MSE_{c(0)} = E\left\{ \frac{\left| \sum_{k \in S_p} \sum_{l=1}^{2} n_l'(k) \left\{ \sum_{m=1}^{2} h_{ml}^*(k) [X_r^m(k)]^* \right\} \right|^2}{\left| \sum_{k \in S_p} \sum_{l=1}^{2} \left| \sum_{m=1}^{2} h_{ml}(k) X_r^m(k) \right|^2 \right|^2} \right\} \quad (9)$$

Without loss of generality, we assume the independence of $X_r^m(k)$ with $E\{|X_r^m(k)|^2\}=1$, and the independence of $h_{mr}(k)$ between different transmit/receive antenna pairs (i.e., for different values of (m,l) pair), with $$E[h_{mr}^*(i) h_{mr}(k)] = \frac{1}{1 - j(k-i)L/N}$$

where L denotes the maximum delay spread in the unit of OFDM sampling time. After some algebraic manipulations, (9) is shown to be $$MSE_{c(0)} \approx \frac{N_p + \sum_{i=1}^{N_p-1} \frac{N_p - i}{1 + (L*i/N_p)^2}}{4N_p^2 + 2N_p + \sum_{i=1}^{N_p-1} \frac{N_p - i}{1 + (L*i/N_p)^2}} \sigma_{n'}^2 \quad (10)$$

where $\sigma_{n'}^2$ is the variance of $n_i'(k)$. It is readily shown that (10) is a monotonic decreasing function of $N_p$, which achieves the maximum value $\sigma_{n'}^2/6$ at $N_p=1$. We thus define the normalized MSE function as $$NMSE = 6 \cdot MSE_{c(0)}/\sigma_{n'}^2 \quad (11)$$

The design criterion for the optimal number of pilots is given by the minimizing the cost function $$(N_p)_{opt} = \min_{N_p}(PSO + NMSE) \quad (12)$$

which determines a certain number of pilots, leading to the best balance between spectral efficiency and receiver performance. Note that, since computational complexity (measured by the complex multiplications needed for (7) is also a linear function of $N_p$ and the normalized complexity (the complex multiplications divided by its maximum value) is approximately $N_p/N$, this cost function in (12) also reflects the tradeoff between computational complexity and performance.

For number of subcarrier N=64, maximum delay spread L=3 we show in FIG. 1 that $(N_p)_{opt}=6$ is the best choice for sake of spectral efficiency and performance. Usually $N_p$ is set to $2^i$ with $i \in [0, \log_2 N]$. Therefore, we could choose 4 or 8 for the sub-optimal number of pilots in this case. Substituting (8), (10) and (11) into (12), it is readily shown that, the cost is 0.6007 for $N_p=4$, while it is 0.5969 with $N_p=8$. Therefore, we choose the number of pilots $N_p=8$ which achieves the best tradeoff between spectral efficiency (or computational complexity) and performance.

Numerical Results: The method of the invention is evaluated now for Rayleigh fading channels by Monte Carlo trials. The OFDM data block is based on the IEEE 802.11a standard, with 64 subcarriers for each OFDM symbol. We apply the space-frequency diversity technique in Lee et al. op cit, to our simulations with QPSK modulation. The length of cyclic prefix is always larger than channel delay spread.

FIG. 2 shows the SER performance of the proposed scheme in comparison to no-mitigation and no-phase-noise case. Apparently, even at the phase noise variance level of $10^{-2}$, which is small indeed, there is an error floor on the SER performance of MIMO-OFDM systems. This error floor makes the performance unacceptable especially at high SNR levels. On the other hand, the method of the invention provides significant performance gain even with only one pilot. FIG. 2 also demonstrates how the performance of the scheme is related to number of pilots. It is quite straightforward to see from FIG. 2 that, for a 64-subcarrier OFDM-system with 2 transmit and 2 receive antennas, choosing the number of pilots equal to 8 achieves close-to-perfect performance while having a relatively low PSO. This coincides with our theoretical result as depicted in FIG. 1, and suggests that $N_p=8$ provides the best balance between performance and efficiency.

The useful range of the method is examined in FIG. 3 which depicts the SER performance of the proposed scheme versus phase noise levels. As discussed earlier, small phase noise mitigation is the main purpose of mitigation as it is very common in practice. Nevertheless, the present scheme should be able to compensate for small phase noise, with variance less than $10^{-1}$. As expected, the method performs well in recovering the corrupted signals with phase noise variance of $10^{-1}$ or less. This Figure also illustrates that, small phase noise with variance of $10^{-3}$ or less, which suggests a very low phase noise linewidth to subcarrier spacing ratio and thus a very accurate oscillator, leads to little performance loss of MIMO-OFDM even without mitigation. Hence, phase noise mitigation may not be necessary under this condition.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly broadly construed and limited only the scope and spirit of the claims appended hereto.

The invention claimed is:

1. A method comprising:
   utilizing pilot subcarrier signals received from multiple receive antennas of a multiple-input, multiple-output orthogonal frequency-division multiplex (MIMO-OFDM) system to obtain an estimate of common phase error (CPE) using a minimum square error criterion, wherein a number of pilot subcarrier signals is chosen to optimize a function of both spectral efficiency and receiver performance; and
   utilizing a resulting CPE estimate to mitigate phase noise, wherein a number of pilots is determined by the minimizing of the cost function $$(N_p)_{opt} = \min_{N_p}(PSO + NMSE),$$

where $N_p$ represents a number of pilots, PSO is a pilot spectral occupancy, and NMSE is a normalized mean square error.

2. A method in accordance with claim 1, wherein the MIMO-OFDM system has 2 transmit and 2 receive antennas.

3. A method in accordance with claim wherein the MIMO-OFDM system has 64 subcarriers.

4. A method in accordance with claim 1, wherein the number of pilots is 8.

5. A method in accordance with claim 1, wherein the phase noise has a variance in the range of $10^{-3}$ to $10^{-1}$.

6. A method in accordance with claim 1, wherein the MIMO-OFDM system has 2 transmit and 2 receive antennas, 64 subcarriers and 8 pilots.

7. A method in accordance with claim 1, wherein said NMSE is defined as a a mean-square error of a CPE estimate multiplied by a normalizing factor that is a function of a variance of a noise quantity that includes additive channel noise and inter-carrier interference noise.

* * * * *